(12) United States Patent
Che et al.

(10) Patent No.: US 12,331,854 B2
(45) Date of Patent: Jun. 17, 2025

(54) ADAPTER, PIPE ASSEMBLY, GLUE GUN HEAD AND GLUE APPLYING DEVICE

(71) Applicant: CONTEMPORARY AMPEREX TECHNOLOGY CO., LIMITED, Ningde (CN)

(72) Inventors: Hongqian Che, Ningde (CN); Ying Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/531,340

(22) Filed: Dec. 6, 2023

(65) Prior Publication Data

US 2025/0003534 A1    Jan. 2, 2025

Related U.S. Application Data

(63) Continuation of application No. PCT/CN2023/103060, filed on Jun. 28, 2023.

(51) Int. Cl.
*F16L 21/02* (2006.01)

(52) U.S. Cl.
CPC .................. *F16L 21/02* (2013.01)

(58) Field of Classification Search
CPC ....... F16L 15/002; F16L 15/007; F16L 15/04; F16L 21/02; F16L 21/03; F16L 21/04;
(Continued)

(56) References Cited

U.S. PATENT DOCUMENTS

| 3,977,705 A | 8/1976 | Thiessen et al. |
| 10,589,309 B2 | 3/2020 | Bierie et al. |
| (Continued) | | |

FOREIGN PATENT DOCUMENTS

| AT | 180184 B | 11/1954 |
| CN | 215215261 U | 12/2021 |
| (Continued) | | |

OTHER PUBLICATIONS

The European Patent Office (EPO) The Extended European Search Report for Application No. 23808655.7, Dec. 17, 2024 9 Pages.
(Continued)

*Primary Examiner* — Aaron M Dunwoody
(74) *Attorney, Agent, or Firm* — ANOVA LAW GROUP, PLLC

(57) ABSTRACT

The present application provides an adapter, a pipe assembly, a glue gun head and a glue applying device. The adapter is configured to connect a first pipe member to a second pipe member, wherein the adapter includes: a pipe joint, having a first accommodating part and a second accommodating part which are disposed at an interval in a first direction, the first accommodating part being configured to connect with the first pipe member, and the second accommodating part being configured to connect with the second pipe member; and a first sealing ring, disposed between the first accommodating part and the second accommodating part, so that the first pipe member and the second pipe member are able to abut against the first sealing ring from both sides of the first sealing ring in the first direction.

14 Claims, 2 Drawing Sheets

(58) Field of Classification Search
CPC ......... F16L 37/02; F16L 37/04; F16L 37/025;
F16L 47/06; F16L 58/02; F16L 58/04;
F16L 58/10; F16L 58/1009; F16L
58/1036; F16L 58/1018; F16L 59/18;
F16L 59/182; B05B 15/65
USPC ....... 285/374, 351, 148.22, 148.23; 239/310,
239/311, 589, 590, 592, 600, 601
See application file for complete search history.

(56) References Cited

U.S. PATENT DOCUMENTS

| 2015/0198567 A1* | 7/2015 | Buerger | G01N 30/6091 |
| | | | 285/347 |
| 2020/0149637 A1 | 5/2020 | Mok | |

FOREIGN PATENT DOCUMENTS

| CN | 216666774 U | 6/2022 |
| CN | 218094831 U | 12/2022 |
| CN | 218152840 U | 12/2022 |
| DE | 112014001073 T5 | 11/2015 |
| EP | 0587131 A1 | 3/1994 |
| JP | 2000081174 A | 3/2000 |
| JP | 2001248771 A | 9/2001 |
| JP | 2005188541 A | 7/2005 |
| WO | 2016174687 A1 | 11/2016 |

OTHER PUBLICATIONS

The World Intellectual Property Organization (WIPO) International Search Report for PCT/CN2023/103060 7 Pages (including translation) Nov. 13, 2023.

* cited by examiner

ADAPTER, PIPE ASSEMBLY, GLUE GUN HEAD AND GLUE APPLYING DEVICE

CROSS-REFERENCE TO RELATED APPLICATION

This application is a continuation of International Application No. PCT/CN2023/103060, filed on Jun. 28, 2023, the entire content of which is incorporated herein by reference.

TECHNICAL FIELD

The present application relates to the field of glue applicators, in particular to an adapter, a pipe assembly, a glue gun head using the pipe assembly, and a glue applying device.

BACKGROUND

At present, wide-width adapters of glue applicators generally use stainless steel adapters. Due to the residual solidification of high-viscosity glue, the internal dry glue of the stainless-steel adapters needs to be cleaned after each use, which is time-consuming and laborious, resulting in increased maintenance frequency. In addition, residual cured dry glue will lead to poor sealing of the joint and shorten the life of the joint. Moreover, the metal integrated joint itself is not easy to operate during disassembly and assembly, and it is not easy to replace and maintain components.

Therefore, there is a demand for improving the wide-width adapters of the glue applicators.

SUMMARY OF THE INVENTION

In view of the above problems, the present application provides an adapter, a pipe assembly, a glue gun head and a glue applying device, which can improve sealing performance of the adapter and facilitate assembly and disassembly.

In a first aspect, the present application provides an adapter, configured to connect a first pipe member and a second pipe member, wherein the adapter includes: a pipe joint, having a first accommodating part and a second accommodating part, the first accommodating part is configured to connect with the first pipe member, the second accommodating part is configured to connect with the second pipe member; and a first sealing ring, disposed between the first accommodating part and the second accommodating part, so that the first pipe member and the second pipe member are able to abut against the first sealing ring from both sides of the first sealing ring in a first direction.

In the technical solution of an embodiment of the present application, by making the first pipe member and the second pipe member abut against the first seal ring from both sides of the first seal ring in the first direction, the fluid flowing in the first sealing ring can be separated from an inner wall of the pipe joint by the first sealing ring. Therefore, the sealing performance of the adapter can be improved, the maintenance frequency of the adapter can be reduced, the service life of the adapter and a connected object can be improved, the loss of spare parts can be reduced, and the cost can be saved.

In some embodiments, the first sealing ring includes a first part and a second part, an outer diameter of the first part is smaller than an outer diameter of the second part, the pipe joint is provided with a stepped part, the stepped part includes a first surface, a second surface and a third surface which are sequentially connected, a radial dimension of the third surface is greater than a radial dimension of the first surface, and the second part abuts against the second surface. Both of the pipe joint and the first sealing ring are provided with the stepped part, and only need to abut the stepped part of the first sealing ring against the stepped part of the pipe joint during assembly. Therefore, simple and reliable mounting can be realized.

In some embodiments, the pipe joint further includes a first groove, the first groove is formed in an end part of the first sealing ring in the first direction, the adapter further includes a second sealing ring, the second sealing ring is disposed in the first groove, the second sealing ring is disposed on an outer side of the first sealing ring in a sleeving mode, and configured to abut against the first pipe member or the second pipe member in the first direction. Therefore, a sealing effect can be improved.

In some embodiments, the second sealing ring includes a base part and a protrusion part, the base part is disposed on an outer side of the first sealing ring in a sleeving mode, and configured to abut against the first pipe member or the second pipe member in the first direction, and the protrusion part protrudes from the base part in the first direction and has a thickness different from that of the base part, and is configured to abut against the first pipe member or the second pipe member from a peripheral side. When the protruding part abuts against the first pipe member or the second pipe member from the peripheral side, the sealing effect can be further improved.

In some embodiments, the first sealing ring is in threaded connection with the pipe joint. Through the threaded connection of the first sealing ring and the pipe joint, the first sealing ring can be mounted inside the pipe joint by screwing instead of pushing.

In some embodiments, the pipe joint is in threaded connection with the first pipe member and/or the second pipe member. Therefore, the pipe joint enables the connection of threaded pipe components.

In some embodiments, the periphery of the pipe joint is in a polygonal shape. By designing the outer shape of the pipe joint as a polygonal shape, compared with a circular shape, the convenience of disassembly and assembly can be improved, and the first pipe member and the second pipe member can be connected conveniently and quickly.

In some embodiments, a peripheral surface of the pipe joint is provided with an anti-slip structure. By forming the peripheral surface of the pipe joint into the anti-slip structure, the surface friction force can be further increased, thereby further improving the convenience of disassembly and assembly, and the first pipe member and the second pipe member can be connected more conveniently and quickly.

In some embodiments, the pipe joint includes a third sealing ring, a second groove is formed in at least one end of the pipe joint in the first direction, the third sealing ring is disposed in the second groove, and the third sealing ring is configured to be disposed on the periphery of the first pipe member or the second pipe member in a sleeving mode. Therefore, the sealing effect at the end part of the pipe joint can be improved.

In some embodiments, the material of the first sealing ring includes polytetrafluoroethylene. In the case where the adapter is applied to the glue gun head, since the inside of the adapter becomes a conveying path for conveying the glue, from the viewpoint of chemical corrosion resistance, the first sealing ring including polytetrafluoroethylene is used to separate the glue entering the flat glue nozzle from the glee mixing pipe from the pipe joint. Therefore, the chemical corrosion resistance of the first sealing ring can be improved, thereby improving its sealing performance. In addition, the maintenance frequency of the adapter can be reduced, the service life of the adapter and the connected object can be improved, the loss of spare parts can be reduced, and the cost can be saved.

In a second aspect, the present application provides a pipe assembly, wherein the pipe assembly includes: the adapter in the above embodiment; a first pipe member, accommodated in a first accommodating part; and a second pipe member, accommodated in a second accommodating part, the first pipe member and the second pipe member respectively abutting against the first sealing ring from both sides in the first direction.

In some embodiments, the first pipe member is a flat nozzle member, the flat nozzle member is of an integrated structure, and includes a flat glue nozzle for spraying glue and a connecting pipe for connecting with the pipe joint and with at least one part engraved with external threads, the flat glue nozzle is located at an opposite side of the adapter of the connecting pipe, the connecting pipe is in threaded connection with the pipe joint, the second pipe member is a glue mixing pipe for inputting glue and with at least one part engraved with external threads, and the glue mixing pipe is in threaded connection with the pipe joint.

In a third aspect, the present application provides a glue gun head, configured to spray glue, wherein the glue gun head is provided with the pipe assembly in the above embodiment.

In a fourth aspect, the present application provides a glue applying device, wherein the glue applying device is provided with the glue gun head in the above embodiment.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

In order to illustrate the technical solutions of the embodiments of the present application more clearly, the following briefly introduces the drawings required in the embodiments of the present application. Obviously, the drawings described below are only some embodiments of the present application. For those of ordinary skill in the art, other drawings can also be obtained according to the drawings without any creative effort. In addition, it should be noted that in the drawings, the drawings are not drawn according to actual scale.

Figure 1:
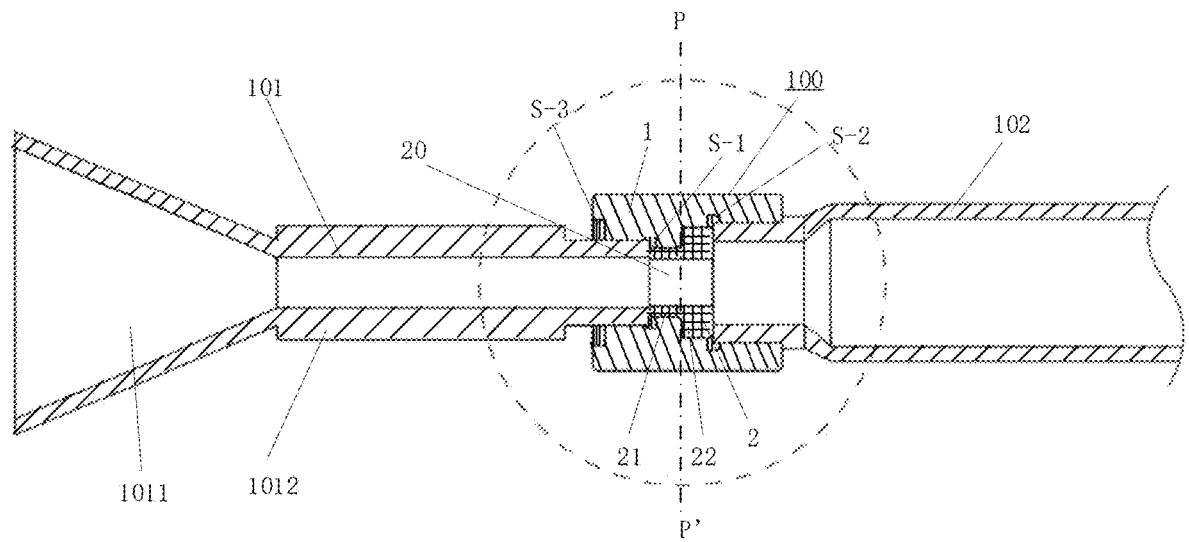
FIG. 1 is a schematic diagram of a pipe assembly disclosed in an embodiment of the present application.

DESCRIPTION OF REFERENCE NUMERALS adapter 100, first pipe member (flat nozzle member) 101, and second pipe member (glue mixing pipe) 102;

pipe joint (threaded pipe joint) 1, and first sealing ring 2;

first accommodating part 11, second accommodating part 12, first surface Q-1, second surface Q-2, and third surface Q-3; first groove 1S and 2S, second groove 3S, through hole 20, first part 21, and second part 22;

second sealing ring S-1 and S-2, and third sealing ring S-3;

Base part S-1a and S-2a, and protruding part S-1b and S-2b; and flat glue nozzle 1011, and connecting pipe 1012.

DETAILED DESCRIPTION

Examples of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including", "provided with" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientation or position relationship indicated by the technical terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. are based on the orientation or position relationship shown in the drawings and are intended to facilitate the description of the embodiments of the present application and simplify the description only, rather than indicating or implying that the device or element referred to must have a particular orientation or be constructed and operated in a particular orientation, and therefore are not to be interpreted as limitations on the embodiments of the present application.

In the description of the embodiments of the present application, unless otherwise expressly specified and limited, the technical terms "mount", "join", "connect", "fix", etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

At present, glue applicators are generally used to apply glue to automobiles. With the increase in demand for automobiles, especially new energy vehicles, the application of the glue applicators is also expanding.

The inventor noticed that due to the residual solidification of high-viscosity glue, wide-width adapters used in the current glue applicators need to be cleaned frequently, and even cause their functions to fail and be forced to be replaced, resulting in increased man-hours and costs. Moreover, due to metal integrated structures of the wide-width adapters, the joint itself is not easy to operate during disassembly and assembly, and is not easy to replace and maintain components.

In order to reduce the maintenance frequency of the wide-width adapters, the inventor found that the sealing performance of the adapters can be improved. Specifically, a sealing ring is disposed in the pipe joint to isolate the contact between the glue and an inner wall of the adapter. Especially in the case that the pipe joint is a threaded pipe joint, the contact between the glue and internal threads of the adapters can be isolated to protect the threads. In addition, in order to improve the convenience of disassembly and assembly, the outer shape of the adapters can be changed. Specifically, its periphery is formed into a polygonal shape, such as a hexagonal shape, and its peripheral surface is formed into an anti-slip structure, such as a knurled surface.

Based on the above considerations, in order to solve the above problems, the inventor designed an adapter after in-depth research. By setting a sealing ring in the pipe joint, the contact between the glue and the inner wall of the adapter can be effectively avoided. At the same time, by changing the outer shape of the adapter, and compared with an existing circular threaded pipe joint, it can conveniently and quickly connect target components.

The adapter disclosed in the embodiments of the present application can be used, but not limited to, to apply glue to automobiles, ships, aircraft, etc., as long as they are viscous liquids. By using the adapter, the pipe assembly, the glue gun head having the pipe assembly and the glue applying device disclosed in the present application, the maintenance frequency of the adapter, the glue gun head, and the glue applying device can be reduced, the service life of the adapter can be prolonged, and the work efficiency can be improved.

For the convenience of description, the following embodiments are illustrated with an adapter 100 of an embodiment of the present application as an example.

Referring to FIG. 1, FIG. 1 is a schematic diagram of a pipe assembly disclosed in an embodiment of the present application. The adapter 100 is configured to connect a first pipe member 101 to a second pipe member 102, the adapter 100 includes: a pipe joint 1, having a first accommodating part 11 and a second accommodating part 12 which are disposed at an interval, the first accommodating part 11 is configured to connect with the first pipe member 101, and the second accommodating part 12 is configured to connect with the second pipe member 102; and a first sealing ring 2, disposed between the first accommodating part 11 and the second accommodating part 12, so that the first pipe member 101 and the second pipe member 102 are able to abut against the first sealing ring 2 from both sides of the first sealing ring 2 in the first direction.

Figure 4:
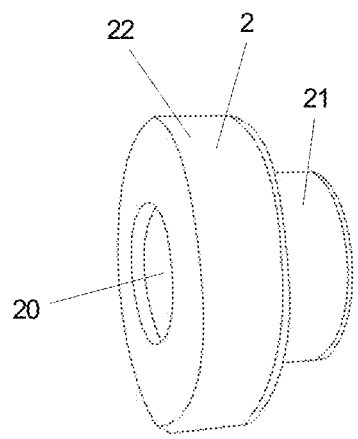
FIG. 4 is a schematic stereoscopic diagram of a first sealing ring disclosed in an embodiment of the present application.

Here, the first direction refers to a longitudinal direction of the adapter 100, the first pipe member 101, the second pipe member 102, etc., and is a horizontal direction in the figure. In addition, as shown in FIG. 4, the first seal ring 2 has a through hole 20 extending in the first direction (longitudinal direction). In FIG. 1, by pushing the first sealing ring 2 from one side of the pipe joint 1 to the inside of the pipe joint 1, thus completing the mounting of the first sealing ring 2.

By mounting the first sealing ring 2 with the through hole 20 extending in the length direction inside the pipe joint 1, the through hole 20 of the first sealing ring 2 and the through holes of the first pipe member 101 and the second pipe member 102 can form a conveying channel. Therefore, when conveying fluid, especially viscous liquid, in the above conveying channel, the first sealing ring 2 can be used to more hermetically separate the conveyed fluid from the inner wall of the pipe joint 1. Therefore, the sealing performance can be improved, the maintenance frequency of the adapter can be reduced, the service life of the adapter and a connected object can be prolonged, the loss of spare parts can be reduced, and the cost can be saved.

According to some embodiments of the present application, as shown in FIG. 4, the first sealing ring 2 includes a first part 21 and a second part 22, and an outer diameter of the first part 21 is smaller than an outer diameter of the second part 22. In addition, as shown in FIG. 1 and FIG. 2, the pipe joint 1 is provided with a stepped part, and the above stepped part includes a first surface Q-1, a second surface Q-2 and a third surface Q-3 which are sequentially connected, and a radial dimension of the third surface Q-3 is greater than a radial dimension of the first surface Q-1.

Correspondingly, as shown in FIG. 4, the first sealing ring 2 is also formed into a stepped shape, that is, has a stepped part which matches the above stepped portion of the pipe joint 1 and is formed by the first part 21 and the second part 22.

When assembling the adapter 100, when the first sealing ring 2 is to be mounted inside the pipe joint 1, since both have the stepped part, the second part 22 of the first sealing ring 2 only needs to abut against the second surface Q-2 of the above stepped part of the pipe joint 1 through a pushing mode. Therefore, simple and reliable mounting can be realized.

Figure 2:
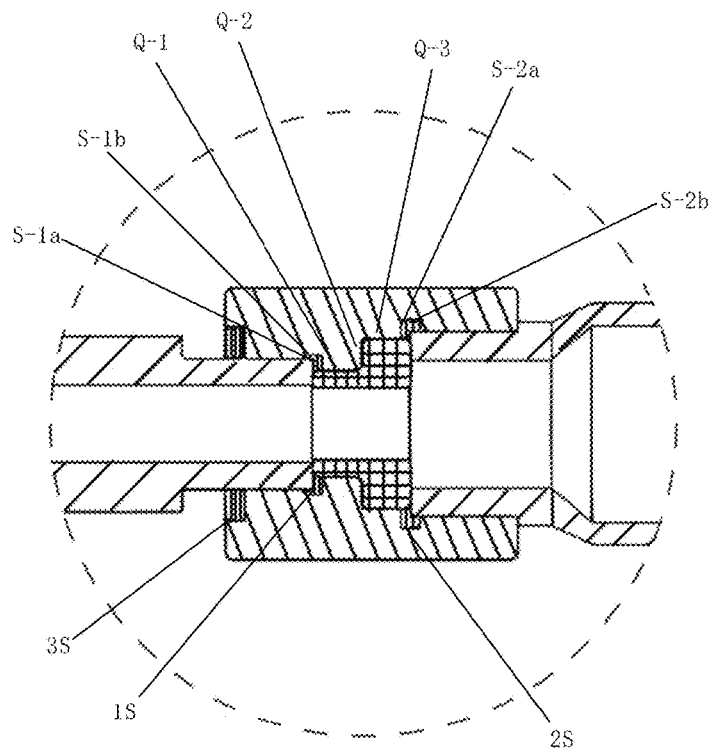
FIG. 2 is a partial enlarged view of the pipe assembly in FIG. 1.
Figure 3:
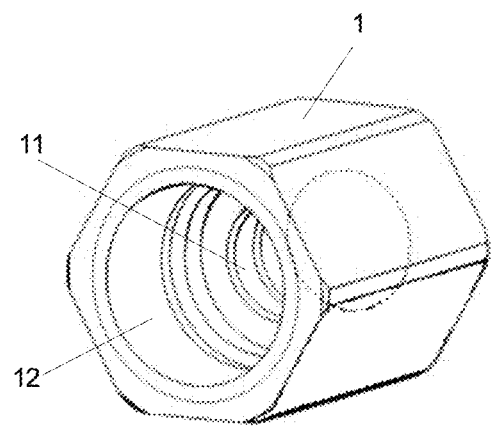
FIG. 3 is a schematic stereoscopic diagram of a pipe joint disclosed in an embodiment of the present application.

According to some embodiments of the present application, as shown in FIG. 1 and FIG. 2, the pipe joint 1 further includes first grooves 1S and 2S, the first grooves 1S and 2S are respectively formed in two end parts of the first sealing ring 2 in the first direction, the adapter 100 further includes second sealing rings S-1 and S-2, the second sealing rings S-1 and S-2 are respectively disposed in the first grooves 1S and 2S, and each of the second sealing rings S-1 and S-2 is disposed on an outer side of the first sealing ring 2 in a sleeving mode, and is configured to abut against the first pipe member 101 and the second pipe member 102 in the above first direction.

Specifically, as shown in FIG. 1 and FIG. 2, the first grooves 1S and 2S are formed in positions, corresponding to the two end parts of the first sealing ring 2 respectively, on the inner wall of the pipe joint 1. Before mounting the first sealing ring 2 into the pipe joint 1, firstly the second sealing rings S-1 and S-2 are inserted into the first grooves 1S and 2S respectively, and then the first sealing ring 2 is mounted into the pipe joint 1 through pushing and inserted into the second sealing rings S-1 and S-2.

Of course, the first groove can also be only formed in a position, corresponding to one end part of the first sealing ring 2, on the inner wall of the pipe joint 1. In this case, the second sealing rings mounted in the first grooves can abut against the first pipe member or the second pipe member in the first direction.

Regardless of whether the second sealing rings are formed in only one end part or at both end parts, the second sealing rings mounted in the first grooves abut against the first pipe member and/or the second pipe member in the first direction, which can further improve the sealing effect.

According to some embodiments of the present application, it is also possible that the second sealing rings S-1 and S-2 include base parts S-1a and S-2a and protruding parts S-1b and S-2b, the base parts S-1a and S-2a are disposed on the outer side of the first sealing ring 2 in a sleeving mode, and configured to abut against the first pipe member 101 or the second pipe member 102 in the first direction, the protruding parts S-1b and S-2b protrude from the base parts S-1a and S-2a in the first direction and has thicknesses different from the base parts S-1a and S-2a, and is configured to abut against the first pipe member 101 or the second pipe member 102 from a peripheral side. The above protruding parts are disposed to abut against the first pipe member 101 or the second pipe member 102 from the peripheral side, which can further improve the sealing effect.

According to some embodiments of the present application, the first sealing ring 2 may be in threaded connection with the pipe joint 1.

At this time, in order to screw the first sealing ring 2 into the pipe joint 1 conveniently to make the pipe joint 1 be integrally formed as a threaded pipe joint (hereinafter sometimes referred to as threaded pipe joint 1), and the peripheral surface of the first sealing ring 2 (for example, the first part 21 and/or the second part 22) is engraved with threads, and when the adapter 100 is assembled, by screwing the first sealing ring 2 into the corresponding position in the threaded pipe joint 1, the first sealing ring 2 is mounted into the threaded pipe joint 1 through threaded connection.

The first sealing ring 2 is in threaded connection with the pipe joint 1, so that the first sealing ring 2 can be mounted inside the pipe joint 1 by screwing instead of pushing.

According to some embodiments of the present application, the pipe joint 1 may be in threaded connection with the first pipe member 101 and/or the second pipe member 102.

At this time, the first accommodating part 11 and/or the second accommodating part 12 of the pipe joint 1 are provided with internal threads, it can be in threaded connection with the first pipe member 101 and/or the second pipe member 102 as a threaded pipe.

According to some embodiments of the present application, the periphery of the pipe joint 1 is in a polygonal shape, such as a hexagonal shape and an octagonal shape.

By designing the outer shape of the pipe joint 1 as the polygonal shape, such as the hexagonal shape and the octagonal shape, compared with a circular shape, the convenience of disassembly and assembly can be improved, and the first pipe member 101 and the second pipe member 102 can be connected conveniently and quickly.

According to some embodiments of the present application, a peripheral surface of the pipe joint 1 may be provided with an anti-slip structure, for example formed as a knurled surface.

The knurled refers to a mechanical process of rolling patterns on a surface of a product, and the surface formed with the rolling patterns is called the knurled surface.

By disposing the anti-slip structure on the peripheral surface of the pipe joint 1, such as the knurled surface, the surface friction force can be further increased, so as to further improve the convenience of disassembly and assembly, and the first pipe member 101 and the second pipe member 102 can be connected more conveniently and quickly.

According to some embodiments of the present application, the pipe joint 1 includes a third sealing ring S-3, a second groove 3S is formed in at least one end of the pipe joint 1 in the first direction, the third sealing ring S-3 is disposed in the second groove 3S, and the third sealing ring S-3 is configured to be disposed on the periphery of the first pipe member 101 or the second pipe member 102 in a sleeving mode.

In FIG. 1, a second groove 3S is formed in a left end of the pipe joint 1 in the first direction, the third sealing ring S-3 is mounted in the second groove 3S, and the third sealing ring S-3 is disposed on the periphery of the first pipe member 101 in a sleeving mode, so that the sealing performance of the adapter 100 is further improved. Of course, a second groove may also be formed in a right end of the pipe joint 1 in the first direction, and a third sealing ring is mounted in the second groove.

According to some embodiments of the present application, the material of the first sealing ring 2 includes polytetrafluoroethylene.

In the case where the adapter 100 of this embodiment is applied to the glue gun head, since the inside of the adapter becomes the conveying channel for conveying the glue, from the perspective of chemical corrosion resistance, a material with high chemical resistance is adopted for the material of the first sealing ring 2, and therefore, for example, the material including polytetrafluoroethylene (PTFE) is adopted.

Therefore, the glue that enters the flat nozzle member 101 (flat glue nozzle 1011) from the glue mixing pipe 102 is separated from the pipe joint 1 by using the first sealing ring 2 made of the material with high chemical corrosion resistance, and the chemical corrosion resistance of the first sealing ring 2 can be improved, thereby improving its sealing performance. In addition, the maintenance frequency of the adapter can be reduced, the service life of the adapter and the flat nozzle member can be prolonged, the loss of spare parts can be reduced, and the cost can be saved.

According to some embodiments of the present application, the present application further provides a pipe assembly, wherein the pipe assembly includes: the adapter 100 described in any solution above; a first pipe member 101, accommodated in a first accommodating part 11; and a second pipe member 102, accommodated in the second accommodating part 12, and the first pipe member 101 and the second pipe member 102 respectively abut against the first sealing ring 2 from both sides in the first direction.

According to some embodiments of the present application, it is also possible that the first pipe member 101 is a flat nozzle member, the above flat nozzle member is of an integrated structure, including a flat glue nozzle 1011 for spraying glue and a connecting pipe 1012 for connecting with the pipe joint 1 and with at least one part engraved with external threads, the flat glue nozzle 1011 is located at an opposite side of the adapter 100 of the connecting pipe 1012, the connecting pipe 1012 is in threaded connection with the pipe joint 1, the second pipe member 102 is a glue mixing pipe for inputting glue and with at least one part engraved with external threads, and the above glue mixing pipe is in threaded connection with the pipe joint 1.

The flat nozzle member refers to a member with a flat nozzle, and the injection pressure is increased by forming the nozzle to be flat.

According to some embodiments of the present application, the present application further provides a glue gun head, configured to spray glue, the above glue gun head is provided the pipe assembly in which the above-mentioned first pipe member 101 is the flat nozzle member, and the second pipe member 102 is the glue mixing pipe.

According to some embodiments of the present application, the present application further provides a glue applying device, the above glue applying device is provided with the glue gun head with the above structure.

As described above, the adapter 100 of this embodiment can be applied to the pipe assembly to which the first pipe member 101 and the second pipe member 102 are connected. Moreover, when the first pipe member 101 and the second pipe member 102 are the flat nozzle member and the glue mixing pipe, the adapter 100 of this embodiment can also be applied to the glue gun head, and can also be applied to the glue applying device of the glue gun head.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. An adapter, configured to connect a first pipe member to a second pipe member, wherein the adapter comprises:
    a pipe joint, having a first accommodating part and a second accommodating part which are disposed at an interval in a first direction, wherein the first accommodating part is configured to connect with the first pipe member, and the second accommodating part is configured to connect with the second pipe member; and
    a first sealing ring, disposed between the first accommodating part and the second accommodating part, so that the first pipe member and the second pipe member are able to abut against the first sealing ring from both sides of the first sealing ring in the first direction, the first sealing ring being in threaded connection with the pipe joint.

2. The adapter according to claim 1, wherein
    the first sealing ring comprises a first part and a second part, an outer diameter of the first part is smaller than an outer diameter of the second part, the pipe joint is provided with a stepped part, the stepped part comprises a first surface, a second surface and a third surface which are sequentially connected, a radial dimension of the third surface is greater than a radial dimension of the first surface, and the second part abuts against the second surface.

3. The adapter according to claim 2, wherein
    the pipe joint further comprises a first groove, the first groove is formed in an end part of the first sealing ring in the first direction, the adapter further comprises a second sealing ring, the second sealing ring is disposed in the first groove, and the second sealing ring is disposed on an outer side of the first sealing ring in a sleeving mode, and configured to abut against the first pipe member or the second pipe member in the first direction.

4. The adapter according to claim 3, wherein
    the second sealing ring comprises a base part and a protrusion part, the base part is disposed on an outer side of the first sealing ring in a sleeving mode, and configured to abut against the first pipe member or the second pipe member in the first direction, and the protrusion part protrudes from the base part in the first direction and has a thickness different from that of the base part, and is configured to abut against the first pipe member or the second pipe member from a peripheral side.

5. The adapter according to any one of claim 1, wherein
    the pipe joint is in threaded connection with the first pipe member and/or the second pipe member.

6. The adapter according to claim 1, wherein
    the periphery of the pipe joint is in a polygonal shape.

7. The adapter according to claim 1, wherein
    a peripheral surface of the pipe joint is provided with an anti-slip structure.

8. The adapter according to claim 1, wherein
    the pipe joint comprises a third sealing ring, a second groove is formed in at least one end of the pipe joint in the first direction, the third sealing ring is disposed in the second groove, and the third sealing ring is configured to be disposed on the periphery of the first pipe member or the second pipe member in a sleeving mode.

9. The adapter according to claim 1, wherein
    the material of the first sealing ring comprises polytetrafluoroethylene.

10. A pipe assembly, wherein the pipe assembly comprises:
    the adapter according to claim 1;
    a first pipe member, accommodated in the first accommodating part; and
    a second pipe member, accommodated in the second accommodating part, the first pipe member and the second pipe member respectively abutting against the first sealing ring from both sides in the first direction.

11. The pipe assembly according to claim 10, wherein the first pipe member is a flat nozzle member, the flat nozzle member is of an integrated structure, and comprises a flat glue nozzle for spraying glue and a connecting pipe for connecting with the pipe joint and with at least one part engraved with external threads, the flat glue nozzle is located at an opposite side of the adapter of the connecting pipe, the connecting pipe is in threaded connection with the pipe joint, the second pipe member is a glue mixing pipe for inputting glue and with at least one part engraved with external threads, and the glue mixing pipe is in threaded connection with the pipe joint.

12. A glue gun head, configured to spray glue, wherein the glue gun head is provided with the pipe assembly according to claim 11.

13. An adapter, configured to connect a first pipe member to a second pipe member, wherein the adapter comprises: a pipe joint, having a first accommodating part and a second accommodating part which are disposed at an interval in a first direction, wherein the first accommodating part is configured to connect with the first pipe member, and the second accommodating part is configured to connect with the second pipe member; a first sealing ring, disposed between the first accommodating part and the second accommodating part, so that the first pipe member and the second pipe member are able to abut against the first sealing ring from both sides of the first sealing ring in the first direction; and a second sealing ring disposed on an outer side of the first sealing ring in a sleeving mode, and configured to abut against the first pipe member or the second pipe member in the first direction; wherein: the first sealing ring comprises a first part and a second part, an outer diameter of the first part is smaller than an outer diameter of the second part, the pipe joint is provided with a stepped part, the stepped part comprises a first surface, a second surface and a third surface which are sequentially connected, a radial dimension of the third surface is greater than a radial dimension of the first surface, and the second part abuts against the second surface; and the pipe joint further comprises a first groove, the first groove is formed in an end part of the first sealing ring in the first direction, the second sealing ring is disposed in the first groove.

14. An adapter, configured to connect a first pipe member to a second pipe member, wherein the adapter comprises: a pipe joint, having a first accommodating part and a second accommodating part which are disposed at an interval in a first direction, wherein the first accommodating part is configured to connect with the first pipe member, and the second accommodating part is configured to connect with the second pipe member; and a first sealing ring, disposed between the first accommodating part and the second accommodating part, so that the first pipe member and the second pipe member are able to abut against the first sealing ring from both sides of the first sealing ring in the first direction; wherein the pipe joint comprises a third sealing ring, a second groove is formed in at least one end of the pipe joint in the first direction, the third sealing ring is disposed in the groove, and the third sealing ring is configured to be disposed on the periphery of the first pipe member or the second pipe member in a sleeving mode.

* * * * *